United States Patent
Lee et al.

(10) Patent No.: US 8,738,842 B2
(45) Date of Patent: May 27, 2014

(54) SOLID STATE DISK CONTROLLER AND DATA PROCESSING METHOD THEREOF

(75) Inventors: Tae Hack Lee, Yongin-si (KR); Kyu Wook Han, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 736 days.

(21) Appl. No.: 12/147,067

(22) Filed: Jun. 26, 2008

(65) Prior Publication Data

US 2009/0024791 A1    Jan. 22, 2009

(30) Foreign Application Priority Data

Jul. 19, 2007   (KR) .................. 10-2007-0071998

(51) Int. Cl.
*G06F 13/00* (2006.01)
(52) U.S. Cl.
USPC .................. 711/103; 711/118; 711/E12.083
(58) Field of Classification Search
USPC .......................... 711/127, 118, 103
See application file for complete search history.

(56) References Cited

U.S. PATENT DOCUMENTS

| | | | | |
|---|---|---|---|---|
| 5,956,743 | A * | 9/1999 | Bruce et al. .................. | 711/103 |
| 7,089,379 | B1 * | 8/2006 | Sharma et al. ................ | 711/154 |
| 7,228,393 | B2 * | 6/2007 | Aakjer ......................... | 711/157 |
| 7,702,831 | B2 * | 4/2010 | Ma et al. ...................... | 710/74 |
| 2010/0030961 | A9 * | 2/2010 | Ma et al. ...................... | 711/115 |

FOREIGN PATENT DOCUMENTS

| | | |
|---|---|---|
| CN | 1828511 | 9/2006 |
| JP | 64-081028 | 3/1989 |
| JP | 06-028261 | 2/1994 |
| JP | 7-262059 | 10/1995 |
| JP | 7-319636 | 12/1995 |
| JP | 10-283120 | 10/1998 |
| JP | 11-065941 | 3/1999 |
| JP | 2000-285017 | 10/2000 |
| KR | 10-2005-0095901 | 10/2005 |

OTHER PUBLICATIONS

Jesung Kim, Jong Min Kim, Sam H. Noh, Sang Lyul Min and Yookun Cho, A Space-Efficient Flash Translation Layer for Compactflash Systems, IEEE Transactions on Consumer Electronics, vol. 48, No. 2, May 2002.*
Andrew S. Tanenbaum, Structured Computer Organization, 1984, Prentice-Hall, Inc. Second Edition, p. 4.*
Chinese Office Action dated Mar. 23, 2011 in corresponding Chinese Appln. No. 200810136100.1.
Zilog Z80 CPU (reference cited in Japanese Office Action) and English translation.
English translation of Japanese Office Action dated Mar. 5, 2013 issued in corresponding Japanese Application No. 2008-156807.
English translation of Japanese Office Action dated Oct. 2, 2012 issued in corresponding Japanese Application No. 2008-156807.

* cited by examiner

*Primary Examiner* — Sean D Rossiter
(74) *Attorney, Agent, or Firm* — F. Chau & Associates, LLC (57) ABSTRACT

A solid state disk controller includes a volatile memory having a memory area storing sector bit map values, and a memory controller. In a read operation, the memory controller selectively reads at least one sector among a plurality of sectors forming a page of an external non-volatile memory based on the sector bit map values stored in the memory area, indicated by a pointer.

15 Claims, 5 Drawing Sheets

SOLID STATE DISK CONTROLLER AND DATA PROCESSING METHOD THEREOF

CROSS-REFERENCE TO RELATED APPLICATION

This application claims the benefit of Korean Patent Application No. 10-2007-0071998, filed on Jul. 19, 2007, the disclosure of which is incorporated by reference herein.

BACKGROUND OF THE INVENTION

1. Technical Field

The present disclosure relates to a data storage device controller, and more particularly, to a solid state disk controller and a data processing method thereof.

2. Discussion of the Related Art

Magnetic disks are used as data storage devices in electronic systems such as computer systems. However, with the development of semiconductor technology, instead of magnetic disks, solid state disks (SSDs) are being used in computer systems and portable devices. These discs use electrically erasable programmable read-only memory (EEPROM) (e.g., NAND-type EEPROM or NOR-type EEPROM) based non-volatile memory to store data.

Since SSDs do not include a mechanical driving device, such as a motor used in hard disk drives (HDDs), the SSDs rarely generate heat and noise during operation. In addition, SSDs have a fast access rate, a high integration, and stability against external impact. Moreover, the data transfer rate of the SSDs is much higher than that of the HDDs.

When an SSD is used as a data storage device, a controller controls data transfer between a host and an EEPROM based non-volatile memory. The controller transmits and receives data to and from the non-volatile memory under the control of firmware when processing data of each page, thereby deteriorating the performance of the SSD.

SUMMARY OF THE INVENTION

According to an exemplary embodiment of the present invention, there is provided a data processing method of a solid state disk controller including, in a read operation, reading sector bit map values stored in a memory area of a volatile memory, indicated by a pointer; and selectively reading at least one sector among a plurality of sectors forming a page of an external non-volatile memory based on the sector bit map values.

According to an exemplary embodiment of the present invention, there is provided a data processing method of a solid state disk controller including, in a read operation, selectively reading at least one sector among a plurality of sectors forming a first page of a first non-volatile memory based on first sector bit map values stored in a first memory area of a volatile memory, indicated by a pointer; and selectively reading at least one sector among a plurality of sectors forming a second page of a second non-volatile memory based on second sector bit map values stored in a second memory area of the volatile memory.

The data processing method may further include transmitting a read command to a channel connected to the first non-volatile memory and the second non-volatile memory for an interleaving read operation.

The selectively reading based on the first sector bit map values may include reading the first sector bit map values stored in the first memory area; and analyzing the first sector bit map values and selectively reading the at least one sector among the plurality of sectors forming the first page based on a result of the analysis, in response to at least one first random data output command.

The selectively reading based on the second sector bit map values may include reading the second sector bit map values stored in the second memory area; and analyzing the second sector bit map values and selectively reading the at least one sector among the plurality of sectors forming the second page based on a result of the analysis, in response to at least one second random data output command.

According to an exemplary embodiment of the present invention, a data processing method of a solid state disk controller includes, in a program operation, reading sector bit map values stored in a memory area of a volatile memory, indicated by a pointer; and selectively programming at least one sector of data output from a host to a page of an external non-volatile memory based on the sector bit map values.

In an exemplary embodiment of the present invention, a solid state disk controller includes a volatile memory comprising a memory area storing sector bit map values and a memory controller. The memory controller selectively reads at least one sector among a plurality of sectors forming a page of an external non-volatile memory based on the sector bit map values stored in the memory area, indicated by a pointer, in a read operation.

The memory controller may include a first register configured to store the pointer, a second register, and a state machine. The state machine may read the sector bit map values from the memory area and store the sector bit map values in the second register based on the pointer, analyze the sector bit map values stored in the second register, and read the at least one sector among the plurality of sectors from the external non-volatile memory based on a result of the analysis, in response to at least one random data output command.

In an exemplary embodiment of the present invention, a solid state disk controller includes a volatile memory comprising a memory area storing sector bit map values, and a memory controller. The memory controller selectively programs at least one sector of data output from a host to a page of an external non-volatile memory, based on the sector bit map values stored in the memory area, indicated by a pointer in a program operation.

In an exemplary embodiment of the present invention, a solid state disk controller includes a volatile memory including a first memory area storing first sector bit map values and a second memory area storing second sector bit map values, and a memory controller. The memory controller selectively reads at least one sector among a plurality of sectors forming a first page of a first external non-volatile memory based on the first sector bit map values stored in the first memory area, indicated by a pointer, and selectively reads at least one sector among a plurality of sectors forming a second page of a second external non-volatile memory based on the second sector bit map values stored in the second memory area, in a read operation.

In an exemplary embodiment of the present invention, a data storage device includes a non-volatile memory, a solid state disk controller, and a channel connected between the non-volatile memory and the solid state disk controller. The solid state disk controller includes a volatile memory comprising a memory area storing sector bit map values, and a memory controller. The memory controller selectively reads at least one sector among a plurality of sectors forming a page of an external non-volatile memory based on the sector bit map values stored in the memory area, indicated by a pointer, in a read operation.

BRIEF DESCRIPTION OF THE DRAWINGS

Exemplary embodiments of the present invention will become apparent by reference to the accompanying drawings, wherein.

DETAILED DESCRIPTION OF EXEMPLARY EMBODIMENTS

Exemplary embodiments of the present invention will be described in detail with reference to the accompanying drawings. Like numbers refer to like elements throughout.

Figure 1:
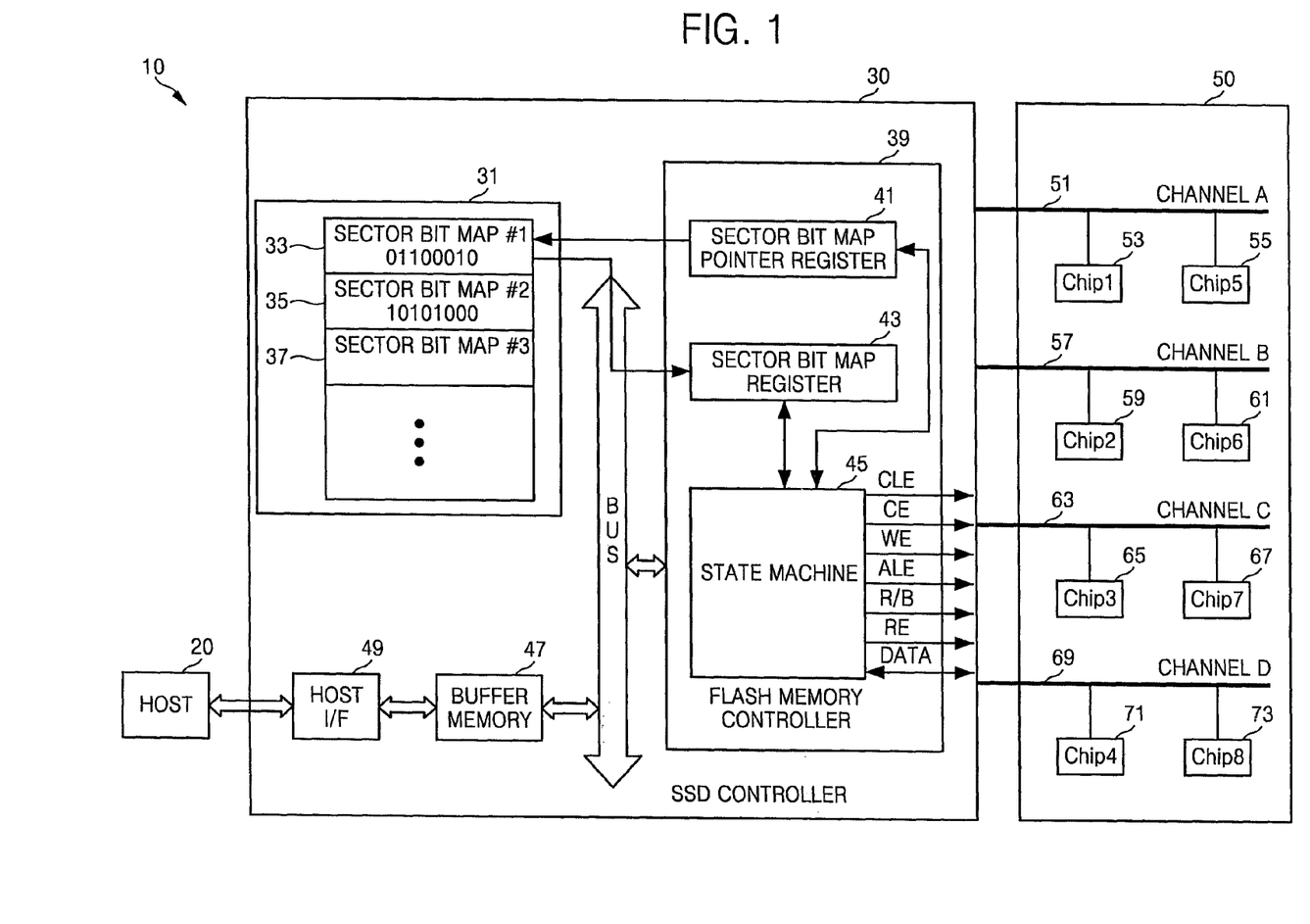
FIG. 1 is a block diagram of a system including a solid state disk (SSD) controller according to an exemplary embodiment of the present invention.

FIG. 1 is a block diagram of a system 10 including a solid state disk (SSD) controller 30 according to an exemplary embodiment of the present invention. Referring to FIG. 1, the system 10, which may be a computer system or a mobile device, includes a host 20, the SSD controller 30, and a non-volatile memory device 50.

The host 20 transmits an operation command (e.g., a read command, a program command, or an erase command) and addresses to the SSD controller 30 via a host interface (I/F) 49 and a system bus (BUS). Alternatively, the host 20 may directly transmit the operation command and the addresses to the SSD controller 30 via the host I/F 49. The SSD controller 30 includes a volatile memory 31, a memory controller (or a flash memory controller) 39, a buffer memory 47, and the host I/F 49.

The volatile memory 31 is implemented by dynamic random access memory (DRAM) or static random access memory (SRAM) and includes a plurality of memory areas 33, 35, and 37 each storing sector bit map values. The sector bit map values stored in the memory areas 33, 35, and 37 may be programmed or set using special hardware or firmware.

The memory controller 39 includes a first register (or a sector bit map pointer register) 41 storing a sector bit map pointer, a second register (or a sector bit map register) 43 storing sector bit map values output from the volatile memory 31 based on the sector bit map pointer, and a state machine 45. The state machine 45 writes data (DATA) to or reads data (DATA) from the non-volatile memory device 50 via a at least one corresponding channel among a plurality of channels 51, 57, 63, and 69 using a plurality of control signals such as a command latch enable (CLE) signal, a chip enable (CE) signal, a write enable (WE) signal, an address latch enable (ALE) signal, a read/busy (R/B) output signal, and a write enable (RE) signal.

The data (DATA) read by the state machine 45 from the non-volatile memory device 50 may be temporarily stored in the buffer memory 47 via the system bus (BUS). The buffer memory 47 temporarily stores the data (DATA) transferred between the host 20 and the non-volatile memory device 50. The host I/F 49 transmits and receives the data (DATA) to and from the host 20. The host I/F 49 may use a serial advanced technology attachment (ATA) protocol, a parallel ATA protocol, or other communication protocols.

The SSD controller 30 and the non-volatile memory device 50 transfer the data (DATA) via at least one channel among the plurality of the channels 51, 57, 63, and 69. Two chips 53 and 55, 59 and 61, 65 and 67, or 71, and 73 may be connected to each of the channels 51, 57, 63, and 69. However, the number of chips connected to each of the channels 51, 57, 63, and 69 may be one or more than two.

Each of the chips 53, 55, 59, 61, 65, 67, 71, and 73 includes a page buffer (not shown) and a memory cell array (not shown) including a plurality of memory cells. Each of the memory cells may be implemented by flash electrically erasable programmable read-only memory (EEPROM). The flash EEPROM may be implemented by a single level cell (SLC) or a multi level cell (MLC).

Figure 2:
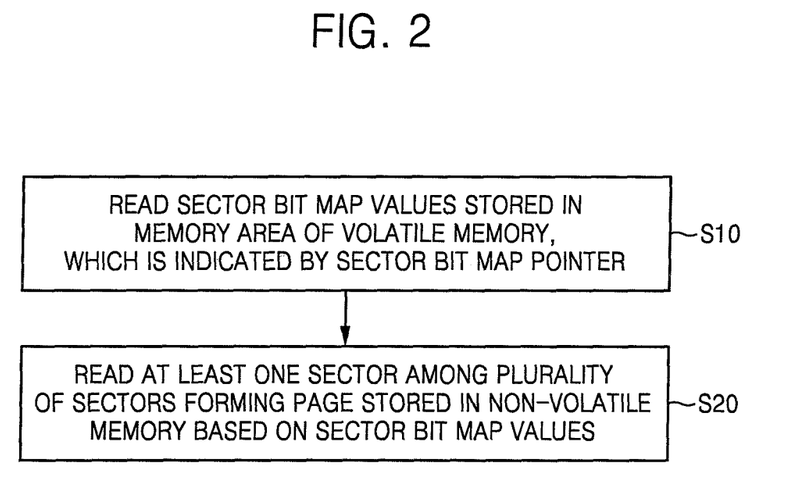
FIG. 2 is a flowchart of a data processing method of the SSD controller illustrated in FIG. 1.
Figure 3A:
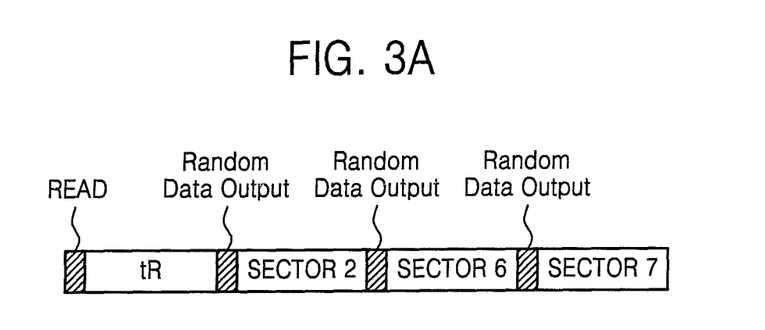
FIGS. 3A and 3B are diagrams for explaining a random data output operation of the SSD controller illustrated in FIG. 1.
Figure 3B:
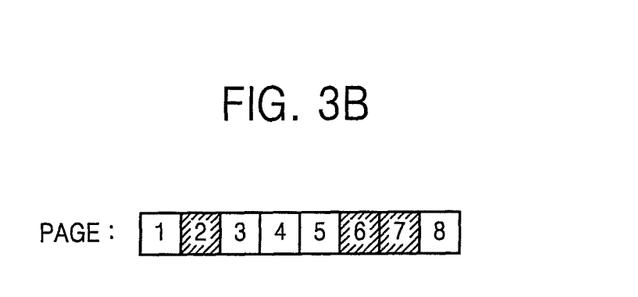

FIG. 2 is a flowchart of a data processing method of the SSD controller 30 illustrated in FIG. 1. FIGS. 3A and 3B are diagrams for explaining the random data output operation of the SSD controller 30 illustrated in FIG. 1. Here, "tR" denotes data transfer time from a memory cell in the memory cell array to the page buffer.

Referring to FIGS. 1 through 3B, a random data output operation is performed by reading at least one sector having a sector bit map value of "1" among "n" sectors (where "n" is a natural number, for example, 8) forming a first page of the first chip 53 connected to the first channel 51. Here, a single sector may have "m" bytes (where "m" is a natural number, for example, 512 or 1024).

In the random data output operation, the state machine 45 generates the plurality of control signals, i.e., the CLE signal, the CE signal, the WE signal, the ALE signal, the R/B output signal, and the RE signal in order to read the data (DATA) stored in the first page of the first chip 53 connected to the first channel 51 in response to a read command (READ) output from the host 20. The first chip 53 analyzes the control signals and performs the read command (READ).

The state machine 45 reads a sector bit map pointer stored in the first register 41, reads sector bit map values (e.g., 01100010) stored in the first memory area 33 of the volatile memory 31, indicated by the sector bit map pointer, and stores the sector bit map values in the second register 43 in operation S10 (FIG. 2). For instance, among the sector bit map values, e.g., 01100010, "1" indicates a valid sector and "0" indicates an invalid sector or vice versa.

The state machine 45 reads and analyzes the sector bit map values (e.g., 01100010) stored in the second register 43 and sequentially outputs a sector address and a random data output command in order to sequentially read sector 2, sector 6, and sector 7 from the first page (or the page buffer of the first chip 53) based on the result of the analysis in operation S20 (FIG. 2), as illustrated in FIG. 3A. In other words, the state machine 45 reads only sectors (e.g., sector 2, sector 6, and sector 7) having a sector bit map value of "1" among the sector bit map values (e.g., 01100010) stored in the second register 43 from the first page or the page buffer of the first chip 53 according to the random data output operation.

The state machine 45 may transmit the read sector 2, sector 6, and sector 7 to the buffer memory 47 via the system bus (BUS) in order to store them in the buffer memory 47. Alternatively, the state machine 45 may transmit the read sector 2, sector 6, and sector 7 directly to the buffer memory 47. Accordingly, the SSD controller 30 does not read all sectors from a page but instead selectively reads only at least one valid sector from the page based on sector bit map values, thereby improving performance.

Figure 4:
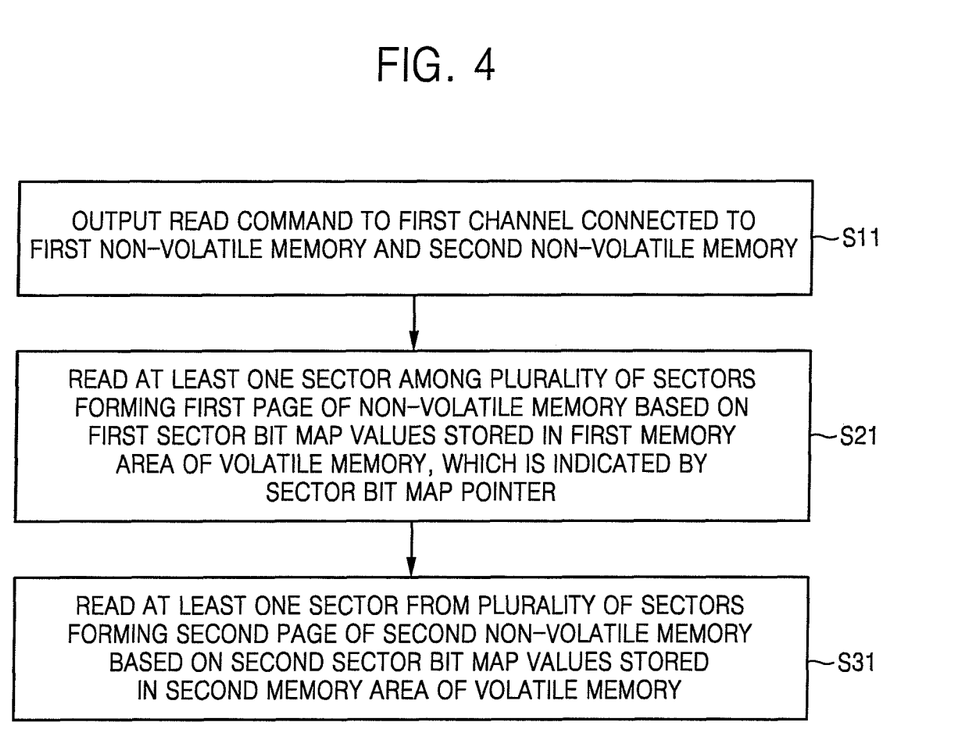
FIG. 4 is a flowchart of a hardware interleaving read operation performed by the SSD controller illustrated in FIG. 1.
Figure 5A:
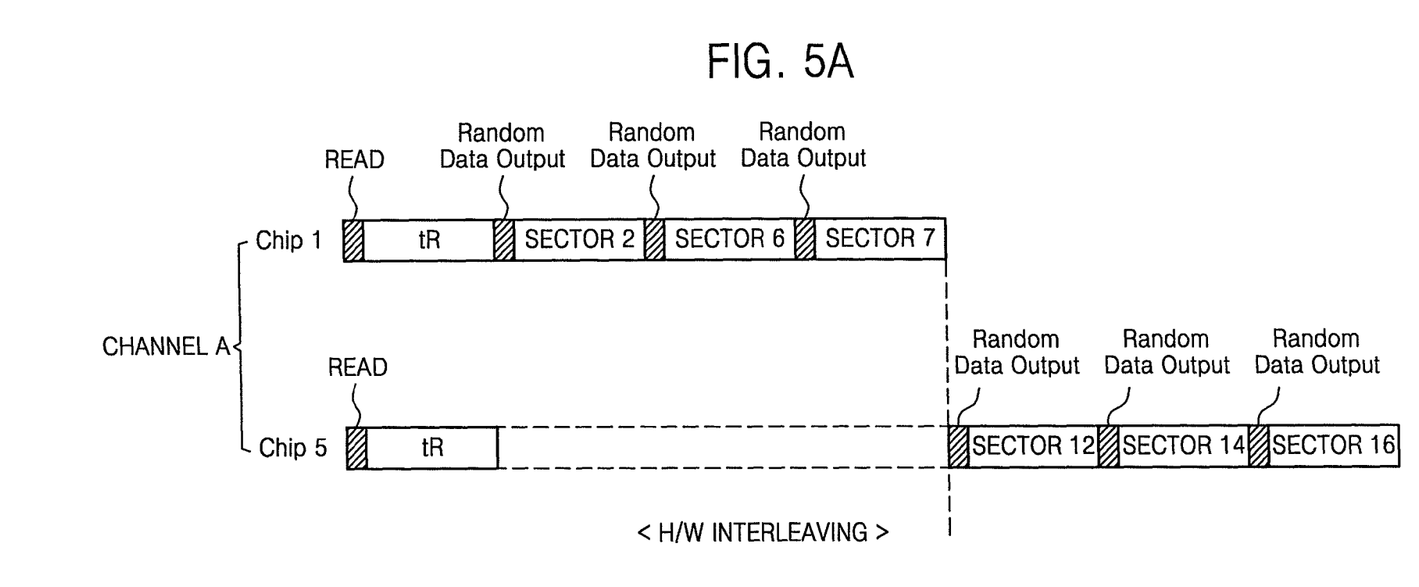
FIGS. 5A and 5B are diagrams for explaining the random data output operation for the hardware interleaving read operation of the SSD controller illustrated in FIG. 1.
Figure 5B:
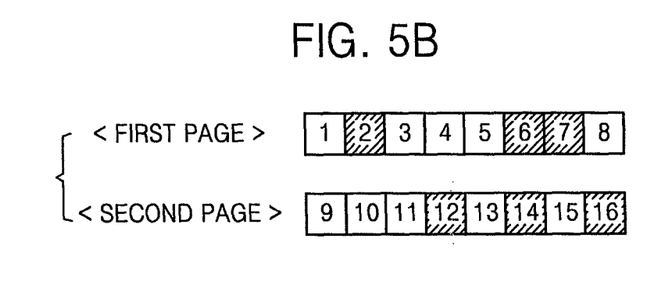

FIG. 4 is a flowchart of a hardware interleaving read operation performed by the SSD controller 30 illustrated in FIG. 1. FIGS. 5A and 5B are diagrams for explaining a random data output operation for the hardware interleaving read operation of the SSD controller 30 illustrated in FIG. 1. Referring to FIGS. 1, 4, 5A, and 5B, the random data output operation is performed by reading only sectors having a sector bit map value of "1" among the "n" sectors forming the first page of the first chip 53 connected to the first channel 51, and only sectors having a sector bit map value of "1" among "n" sectors forming a second page of the fifth chip 55 connected to the first channel 51.

The state machine 45 outputs the plurality of control signals (i.e., the CLE signal, the CE signal, the WE signal, the ALE signal, the R/B output signal, and the RE signal) to the first channel 51 in order to read data stored in the first page of the first chip 53, and data stored in the second page of the fifth chip 55, in response to a read command (READ) (FIG. 5A) output from the host 20 in operation S11 (FIG. 4).

Thereafter, the state machine 45 reads a sector bit map pointer stored in the first register 41, reads first sector bit map values (e.g., 01100010) stored in the first memory area 33 of the volatile memory 31, indicated by the sector bit map pointer, stores the first sector bit map values in the second register 43, and reads the sector 2, sector 6, and sector 7 among the "n" sectors forming the first page of the first chip 53 based on the first sector bit map values (i.e., 01100010) stored in the second register 43 in operation S21 (FIG. 4), as illustrated in FIG. 5A. In other words, the state machine 45 reads only sectors (i.e., the sector 2, sector 6, and sector 7) having a sector bit map value of "1" among the sector bit map values, 01100010, stored in the second register 43 from the first page (FIG. 5B) or the page buffer of the first chip 53 through the random data output operation. The state machine 45 may transmit the read sector 2, sector 6, and sector 7 to the buffer memory 47 directly or via the system bus (BUS) to store them in the buffer memory 47.

After the random data output operation with respect to the first page is terminated, the state machine 45 reads second sector bit map values (e.g., 10101000) stored in the second memory area 35 of the volatile memory 31, stores the second sector bit map values in the second register 43, and reads sector 12, sector 14 and sector 16 among the "n" sectors forming the second page of the fifth chip 55 from the second page (FIG. 5B) or the page buffer of the fifth chip 55 based on the second sector bit map values (i.e., 10101000) stored in the second register 43 in operation S31 (FIG. 4), as illustrated in FIG. 5A. The second memory area 35 may be a memory area which increase the sector bit map pointer indicated the first memory area 33. In other words, the state machine 45 reads only sectors (i.e., the sector 12, sector 14, and sector 16) having a sector bit map value of "1" among the sector bit map values, 10101000, stored in the second register 43 from the second page or the page buffer of the fifth chip 55 through the random data output operation. The state machine 45 may transmit the read sector 12, sector 14, and sector 16 to the buffer memory 47 directly or via the system bus (BUS) to store them in the buffer memory 47.

Accordingly, in the interleaving read operation, the SSD controller 30 according to an exemplary embodiment of the present invention automatically reads sector bit map values stored in each of the plurality of memory areas of the volatile memory 31 without intervention of firmware, and selectively reads only at least one sector from a certain page, thereby improving performance. For clarity of the description, the read operation has been described, but the data processing method using a pointer according to an exemplary embodiments of the present invention can also be used in a write or program operation.

For example, in the writing (or program) operation, the state machine 45 reads a sector bit map pointer stored in the first register 41, reads sector bit map values (e.g., 01100010) stored in the first memory area 33 of the volatile memory 31, indicated by the sector bit map pointer, and stores the sector bit map values (i.e., 01100010) in the second register 43. Next, the state machine 45 reads and analyzes the sector bit map values, 01100010, stored in the second register 43 and selectively writes (or programs) only sector 2, sector 6, and sector 7 among data output from the host 20 to the first chip 53 via the channel 51 based on the result of the analysis (e.g., the result of analyzing whether each sector bit map value is "1" or "0").

In addition, the state machine 45 may write or program at least one sector having a sector bit map value of "1" to the first page of the first chip 53 connected to the first channel 51, and at least one sector having a sector bit map value of "1" to the second page of the fifth chip 55 connected to the first channel 51 in the interleaving operation.

For instance, the state machine 45 reads a sector bit map pointer stored in the first register 41 in response to a write or program command output from the host 20. Next, the state machine 45 reads the first sector bit map values (e.g., 01100010) stored in the first memory area 33 of the volatile memory 31, indicated by the sector bit map pointer, stores the first sector bit map values in the second register 43, and selectively writes the sector 2, sector 6, and sector 7 of data output from the host 20 to the first page of the first chip 53 based on the first sector bit map values (i.e., 01100010) stored in the second register 43. After finishing the write or program operation to the first page, the state machine 45 reads the second sector bit map values (e.g., 10101000) stored in the second memory area 35 of the volatile memory 31, stores the second sector bit map values in the second register 43, and selectively writes sector 12, sector 14, and sector 16 of data output from the host 20 to the second page of the fifth chip 55, based on the second sector bit map values (i.e., 10101000) stored in the second register 43.

Accordingly, in the interleaving write or program operation, the SSD controller 30 according to an exemplary embodiment of the present invention automatically reads sector bit map values stored in each of the plurality of memory areas of the volatile memory 31 without intervention of firmware, and selectively writes or programs at least one sector in data output from a host to a certain page based on the sector bit map values. Since the SSD controller 30 does not unnecessarily write or program all data to a certain page, the performance of the SSD controller 30 is improved.

According to an exemplary embodiment of the present invention, in an interleaving read operation, an SSD controller automatically reads sector bit map values stored in each of a plurality of memory areas of a volatile memory without intervention of firmware, and selectively reads at least one sector from a certain page, thereby improving performance. In addition, the SSD controller automatically reads sector bit map values stored in each of the plurality of memory areas of the volatile memory without intervention of the firmware, and writes or programs at least one sector in data output from a host to a certain page based on the sector bit map values, thereby improving performance.

While exemplary embodiments of the present invention have been described for illustrative purposes, it will be understood by those of ordinary skill in the art that various changes in forms and details may be made therein without departing from the spirit and scope of the disclosure.

What is claimed is:

1. A data processing method of a solid state disk controller, the data processing method comprising:
   reading, with a state machine, a sector bit map pointer stored in a first register;
   reading, with the state machine, sector bit map values stored in a first memory area of a volatile memory, wherein the sector bit map values are indicated by the sector bit map pointer and the sector bit map values identify which sectors forming a page of an external non-volatile memory are to be read or not;
   storing the sector bit map values read from the first memory area in a second register;
   providing the sector bit map values from the second register to the state machine; and
   reading, with the state machine, data from at least one of the sectors, but not all of the sectors, of the page based on the sector bit map values.

2. The data processing method of claim 1, wherein the reading is performed in response to at least one random data output command.

3. The data processing method of claim 1, further comprising storing the data read from the at least one sector in a buffer memory.

4. The data processing method of claim 1, wherein each sector bit map value is a binary value, wherein a first binary value identifies a sector of the page to be read and a secondary binary value identifies a sector of the page not to be read.

5. The data processing method of claim 1, further comprising:
   in a write operation, reading sector bit map values stored in a second memory area of the volatile memory; and
   writing data to the sectors of a page of the non-volatile memory according to the sector bit map values read from the second memory area.

6. A data processing method of a solid state disk controller, the data processing method comprising:
   reading, with a state machine, a sector bit map pointer stored in a first register;
   reading, with the state machine, first sector bit map values stored in a first memory area of a volatile memory, wherein the first sector bit map values are indicated by the sector bit map pointer and the first sector bit map values identify which sectors forming a first page of a first non-volatile memory are to be read or not;
   storing the first sector bit map values read from the first memory area in a second register;
   providing the first sector bit map values from the second register to the state machine;
   selectively reading, with the state machine, data from at least one sector, but not all sectors, among a plurality of sectors forming the first page of the first non-volatile memory based on the first sector bit map values; and
   selectively reading, with the state machine, data from at least one sector among a plurality of sectors forming a second page of a second non-volatile memory based on second sector bit map values stored in a second memory area of the volatile memory,
   wherein the first and second sector bit map values are read by the state machine not under control of firmware.

7. The data processing method of claim 6, further comprising transmitting a read command to a channel connected to the first non-volatile memory and the second non-volatile memory for an interleaving read operation.

8. The data processing method of claim 6, wherein the selectively reading based on the first sector bit map values comprises:
   reading the first sector bit map values stored in the first memory area; and
   analyzing the first sector bit map values and selectively reading the at least one sector, but not all of the sectors, among the plurality of sectors forming the first page based on a result of the analysis, in response to at least one first random data output command.

9. The data processing method of claim 8, wherein the selectively reading based on second sector bit map values comprises:
   reading the second sector bit map values stored in the second memory area; and
   analyzing the second sector bit map values and selectively reading the at least one sector among the plurality of sectors forming the second page based on a result of the analysis, in response to at least one second random data output command.

10. A data processing method of a solid state disk controller, the data processing method comprising:
    reading, with a state machine, a sector bit map pointer stored in a first register;
    reading, with the state machine, sector bit map values stored in a memory area of a volatile memory, wherein the sector bit map values are indicated by a the sector bit map pointer;
    storing the sector bit map values read from the memory area in a second register;
    providing the sector bit map values from the second register to the state machine; and
    selectively programming, with the state machine, at least one sector, but not all sectors, of a plurality of sectors forming a page of an external non-volatile memory with data output from a host, based on the sector bit map values.

11. A solid state disk controller comprising:
    a volatile memory comprising a memory area storing sector bit map values; and
    a memory controller comprising a first register, a second register and a state machine, the first register is configured to store a pointer and the state machine is configured to read the pointer stored in the first register and read the sector bit map values stored in the volatile memory, wherein the sector bit map values are indicated by the pointer, the second register is configured to receive and store the read sector bit map values, and the state machine is configured to read and analyze the sector bit map values stored in the second register to output a sector address and random data output command to read at least one sector, but not all sectors, among a plurality of sectors forming a page of an external non-volatile memory based on the analysis of the sector bit map values stored in the second register.

12. A solid state disk controller comprising:
    a volatile memory comprising a memory area storing sector bit map values; and
    a memory controller configured to read with a state machine a sector bit map pointer stored in a first register, read with the state machine the sector bit map values stored in the memory area, wherein the sector bit map values are indicated by the sector bit map pointer, store the sector bit map values read from the memory area in a second register, provide the sector bit map values from the second register to the state machine, and selectively program, with the state machine, at least one sector, but not all sectors, of a plurality of sectors forming a page of an external non-volatile memory with data output from a host, based on the sector bit map values.

13. A solid state disk controller comprising:
a volatile memory comprising a first memory area storing first sector bit map values and a second memory area storing second sector bit map values; and
a memory controller configured to read with a state machine a sector bit map pointer stored in a first register, read with the state machine the first sector bit map values stored in the first memory area, wherein the first sector bit map values are indicated by the sector bit map pointer and the first sector bit map values identify which sectors forming a first page of a first external non-volatile memory are to be read or not, store the first sector bit map values in a second register, provide the first sector bit map values from the second register to the state machine, selectively read, with the state machine, at least one sector, but not all sectors, among a plurality of sectors of the first page of the first external non-volatile memory based on the first sector bit map values, and to selectively read, with the state machine, at least one sector among a plurality of sectors forming a second page of a second external non-volatile memory based on the second sector bit map values stored in the second memory area, wherein the memory controller is not controlled by firmware to read the first and second sector bit map values.

14. The solid state disk controller of claim 13, wherein when the read operation is an interleaving read operation, the memory controller outputs a read command to a channel connected to the first external non-volatile memory and the second external non-volatile memory.

15. A data storage device comprising:
a non-volatile memory;
a solid state disk controller; and
a channel connected between the non-volatile memory and the solid state disk controller,
wherein the solid state disk controller comprises:
a volatile memory comprising a memory area storing sector bit map values; and
a memory controller configured to read with a state machine a sector bit map pointer stored in a first register, read with the state machine the sector bit map values stored in the memory area of the volatile memory, wherein the sector bit map values are indicated by the sector bit map pointer and the sector bit map values identify which sectors forming a page of the non-volatile memory are to be read or not, store the sector bit map values read from the memory area in a second register, provide the sector bit map values from the second register to the state machine and selectively read, with the state machine, at least one sector, but not all sectors, among a plurality of sectors of the page based on the sector bit map values.

* * * * *